US009984160B2

(12) United States Patent
Cohen et al.

(10) Patent No.: US 9,984,160 B2
(45) Date of Patent: May 29, 2018

(54) DETERMINING A QUERY ANSWER SELECTION (71) Applicant: International Business Machines Corporation, Armonk, NY (US)

(72) Inventors: Doron Cohen, Misgav (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 14/870,467

(22) Filed: Sep. 30, 2015

(65) Prior Publication Data

US 2017/0091288 A1 Mar. 30, 2017

(51) Int. Cl.
*G06F 17/30* (2006.01)
*G06N 5/00* (2006.01)

(52) U.S. Cl.
CPC .. *G06F 17/30864* (2013.01); *G06F 17/30634* (2013.01); *G06N 5/00* (2013.01)

(58) Field of Classification Search
CPC .............. G06F 17/30864; G06F 17/30634
USPC ........................................................ 707/706
See application file for complete search history.

(56) References Cited

U.S. PATENT DOCUMENTS

| 5,696,964 | A | * | 12/1997 | Cox ................... G06F 17/30017 |
| | | | | 707/723 |
| 7,747,980 | B2 | * | 6/2010 | Illowsky ............... G06F 1/3203 |
| | | | | 717/107 |
| 7,953,720 | B1 | | 5/2011 | Rohde et al. |
| 8,229,734 | B2 | | 7/2012 | Bennett |
| 8,280,900 | B2 | | 10/2012 | Pickens et al. |
| 8,676,827 | B2 | | 3/2014 | Metzler et al. |
| 9,323,844 | B2 | * | 4/2016 | Kasterstein ....... G06F 17/30716 |
| | | | | 707/706 |
| 2011/0125783 | A1 | * | 5/2011 | Whale ............... G06F 17/30011 |
| | | | | 707/769 |
| 2011/0307463 | A1 | * | 12/2011 | Kasterstein ....... G06F 17/30716 |
| | | | | 707/706 |
| 2015/0142649 | A1 | * | 5/2015 | Rathod ............. G06F 17/30867 |
| | | | | 705/40 |

OTHER PUBLICATIONS

Balasubramanian et al.; "Learning to Select Rankers"; SIGIR'10; Jul. 19-23, 2010; Geneva, Switzerland; ACM; 2 pages.

(Continued)

*Primary Examiner* — Shahid Alam
(74) *Attorney, Agent, or Firm* — Alexander G. Jochym (57) ABSTRACT

A tool for determining a query answer selection. The tool receives one or more queries. The tool retrieves one or more strong searcher answers and one or more weak searcher answers, wherein the one or more strong searcher answers are provided by one or more strong searcher engines and the one or more weak searcher answers are provided by one or more weak searcher engines. The tool determines one or more pseudo-query answers, wherein determining the one or more pseudo-query answers includes utilizing the one or more strong searcher answers as a query to the one or more weak searcher engines. Responsive to determining one or more quality predictors, the tool determines whether at least one of the one or more quality predictors for the one or more pseudo-query answers exceeds at least one of the one or more quality predictors for the one or more weak searcher answers.

17 Claims, 3 Drawing Sheets

(56) References Cited

OTHER PUBLICATIONS

Carmel et al.; "Query Performance Prediction for IR"; SIGIR Tutorial; Portland, Oregon; Aug. 12, 2012; 16 pages.
Izsak et al.; "The Search Duel: A Response to a Strong Ranker"; SIGIR'14; Jul. 6-11, 2014; Gold Coast, Queensland, Australia; Copyright 2014, ACM; pp. 919-922.
Lavrenko et al.; "Relevance-Based Language Models"; SIGIR'01; Sep. 9-12, 2001; New Orleans, Louisiana; Copyright 2001, ACM; 8 pages.
Losada; "Statistical query expansion for sentence retrieval and its effects on weak and strong queries"; © 2009, Kluwer Academic Publishers; Printed in the Netherlands; Sep. 2, 2009; pp. 1-40.
Ozdemiray et al.; "Query Performance Prediction for Aspect Weighting in Search Result Diversification"; CIKM'14; Nov. 3-7, 2014; Shanghai, China; Copyright is held by the owner/author(s); Publication rights licensed to ACM; pp. 1871-1874.
Wu; "Data Fusion in Information Retrieval"; Springer Berlin Heidelberg; vol. 13, No. 1; © Springer-Verlag Berlin Heidelberg, 2012; Printed on: Jun. 19, 2015; pp. 1-212.
"Sigmoid function"; From: Wikipedia, the free encyclopedia; Last modified: Feb. 18, 2015; Printed on: Jun. 19, 2015; pp. 1-2. <https://en.wikipedia.org/wiki/Sigmoid_function>.

\* cited by examiner

DETERMINING A QUERY ANSWER SELECTION

BACKGROUND

The present invention relates generally to queries, and more particularly, to determining a query answer selection.

When a query answering (QA) system receives a query from a user, the QA system may provide one or more answers to match the user's information needs. Typically, a QA system may determine one or more answers by querying a single searcher. The single searcher may be a strong searcher in which the strong searcher may provide a single answer to the query and may not allow public access to the strong searcher's retrieval algorithm, index, statistics, or other functions of the strong searcher known in the art. The strong searcher may be a cognitive QA system, intelligent personal assistant, knowledge navigator, or an artificially intelligent computing system. The single searcher may be a weak searcher in which the weak searcher may allow public access to the weak searcher's retrieval algorithm, index, and statistics. A weak searcher may allows a user to retrieve one or more answers to the received query. A weak searcher may be a traditional search engine known in the art. A strong searcher may be a searcher known in the art that utilizes sophisticated search (i.e., retrieval) algorithms (e.g., a searcher trained over the searched corpora using learning to rank or deep learning algorithms) to provide higher quality (i.e., more accurate) answers when compared to a weak searcher. Unlike a strong searcher, a weak searcher may not have access to the answer corpora, rather the weak searcher may have access to a different, less effective corpus, or may employ simple search algorithms (e.g., vector-space model ranking).

SUMMARY

Aspects of an embodiment of the present invention disclose a method, system, and computer program product for determining a query answer selection. The method includes receiving, by one or more computer processors, one or more queries, wherein the one or more queries include one or more question types. The method includes retrieving, by one or more computer processors, one or more strong searcher answers and one or more weak searcher answers, wherein the one or more strong searcher answers are provided by one or more strong searcher engines and the one or more weak searcher answers are provided by one or more weak searcher engines. The method includes determining, by one or more computer processors, one or more pseudo-query answers, wherein determining the one or more pseudo-query answers includes utilizing the one or more strong searcher answers as a query to the one or more weak searcher engines. The method includes determining, by one or more computer processors, one or more quality predictors for the one or more pseudo-query answers and the one or more weak searcher answers. Responsive to determining the one or more quality predictors, the method includes determining, by one or more computer processors, whether at least one of the one or more quality predictors for the one or more pseudo-query answers exceeds at least one of the one or more quality predictors for the one or more weak searcher answers.

DETAILED DESCRIPTION

Embodiments of the present invention recognize a typical QA system receives a query and provides an answer to match a user's information needs, in which the QA system determines the answer by querying a single searcher.

Embodiments of the present invention provide the capability to determine a query answer selection between one or more searchers. Embodiments of the present invention provide the capability to determine a query answer selection as described below with references to FIGS. 1-3.

Implementation of such embodiments may take a variety of forms, and exemplary implementation details are discussed subsequently with reference to the Figures.

Figure 1:
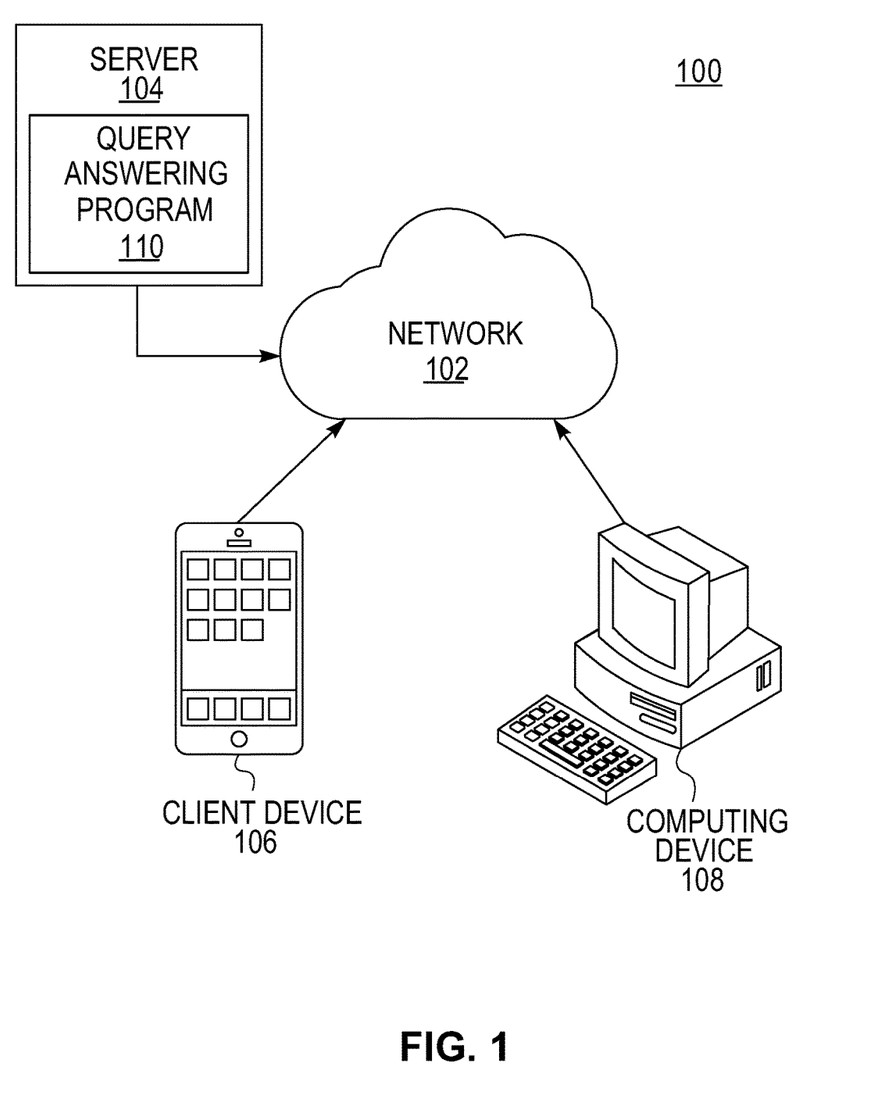
FIG. 1 is a functional block diagram illustrating a data processing environment, in accordance with an embodiment of the present invention.

FIG. 1 is a functional block diagram illustrating a data processing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, which operates query answering program 110, and multiple devices, such as client device 106 and computing device 108.

In one embodiment, network 102 can be, for example, a local area network (LAN), a telecommunications network, a wide area network (WAN), such as the Internet, a virtual local area network (VLAN), or any combination that can include wired, wireless, or fiber optic connections. Network 102 can also include wire cables, wireless communication links, fiber optic cables, routers, switches and/or firewalls. Network 102 interconnects server 104, client device 106, and computing device 108. In general, network 102 can be any combination of connections and protocols capable of supporting communications between server 104, client device 106, and computing device 108, and query answering program 110.

In one embodiment, server 104 is a web-based server hosting query answering program 110, in accordance with an embodiment of the present invention. In one embodiment, server 104 can be a web server, a blade server, a mobile computing device, a laptop computer, a tablet computer, a netbook computer, a personal computer (PC), a desktop computer, or any programmable electronic device or computing system capable of receiving and sending data, via network 102, and performing computer-readable program instructions. In another embodiment, server 104 can be a data center, consisting of a collection of networks and servers providing an IT service, such as virtual servers and applications deployed on virtual servers, to an external party. In another embodiment, server 104 represents a computing system utilizing clustered computers and components (e.g., database server computer, application server computers, etc.) that act as a single pool of seamless resources, such as in a cloud computing environment, when accessed within data processing environment 100. In some embodiments, server 104 can include a data storage repository (not shown)

for storing data including, but not limited to, queries, strong searcher answers, weak searcher answers, and pseudo-query answers. Data storage repository can be one of, a web server, a mobile computing device, a laptop computer, a tablet computer, a netbook computer, a personal computer (PC), a desktop computer, or any programmable electronic device or computing system capable of receiving, storing, and sending queries, strong searcher answers, weak searcher answers, and pseudo-query answers, and performing computer readable program instructions capable of communicating with server 104, client device 106, and computing device 108, via network 102. In other embodiments, data storage repository can represent virtual instances operating on a computing system utilizing clustered computers and components (e.g., database server computer, application server computers, etc.) that act as a single pool of seamless resources when accessed within data processing environment 100.

In one embodiment, server 104 includes query answering program 110 to determine a query answer selection between a weak searcher and a strong searcher. In an embodiment, query answering program 110 receives a query. Query answering program 110 retrieves one or more strong search answers utilizing a strong searcher. Query answering program 110 retrieves one or more weak searcher answers. Query answering program 110 determines one or more pseudo-query answers. Query answering program 110 determines one or more quality predictors. Responsive to determining one or more quality predictors, query answering program 110 determines whether a quality predictor for one or more pseudo-query answers exceeds a quality predictor for one or more weak answers. Where query answering program 110 determines the quality predictor for one or more pseudo-query answers does not exceed a quality predictor for one or more weak answers, query answering program 110 returns the one or more weak answers as a selection to the query. Where query answering program 110 determines the quality predictor for one or more pseudo-query answers does exceed a quality predictor for one or more weak answers, query answering program 110 returns the one or more strong answers as a selection to the query.

In one embodiment, query answering program 110 operates on a central server, such as server 104. Query answering program 110 can be utilized by one or more devices, such as client device 106 and computing device 108, via a mobile application downloaded from the central server or a third-party application store, and can be executed on the one or more computing devices. In another embodiment, query answering program 110 can be a software-based program, downloaded from a central server, such as server 104, and installed on one or more devices, such as client device 106 and computing device 108. In yet another embodiment, query answering program 110 can be utilized as a software service provided by a third-party cloud service provider (not shown).

In some embodiments, client device 106 and computing device 108 are clients to server 104 and can be, for example, a desktop computer, a laptop computer, a tablet computer, a personal digital assistant (PDA), a smart phone, a thin client, or any other electronic device or computing system capable of communicating with server 104 through network 102. For example, client device 106 may be a smartphone and computing device 108 may be a laptop computer capable of connecting to a network, such as network 102, to access and utilize query answering program 110 hosted on server 104. In other embodiments, client device 106 and computing device 108 can be any suitable type of mobile devices capable of running mobile applications, such as a smart phone, tablet, slate, or any type of device that runs a mobile operating system. In yet other embodiments, client device 106 and computing device 108 can represent a virtual instances operating on a computing system utilizing clustered computers and components (e.g., database server computer, application server computers, etc.) that act as a single pool of seamless resources when accessed within data processing environment 100.

In yet another embodiment, client device 106 and computing device 108 can include a user interface (not shown) for providing an end user with the capability to interact with query answering program 110. For example, an end user may access query answering program 110 through the user interface to enable query answering program 110 to operate on the end user's device. A user interface refers to the information (such as graphic, text, and sound) a program presents to a user and the control sequences the user employs to control the program. In one embodiment, the user interface can be a graphical user interface (GUI). A GUI may allow users to interact with electronic devices, such as a keyboard and mouse, through graphical icons and visual indicators, such as secondary notations, as opposed to text-based interfaces, or typed command labels.

In alternative embodiments, client device 106 and computing device 108 can be any wearable electronic device, including wearable electronic devices affixed to eyeglasses and sunglasses, helmets, wristwatches, clothing, wigs, and the like, capable of sending, receiving, and processing data. For example, client device 106 may be a wearable electronic device, such as a wristwatch or an article of clothing, capable of receiving a query and capable of receiving answers from a strong searcher and weak searcher.

Figure 2:
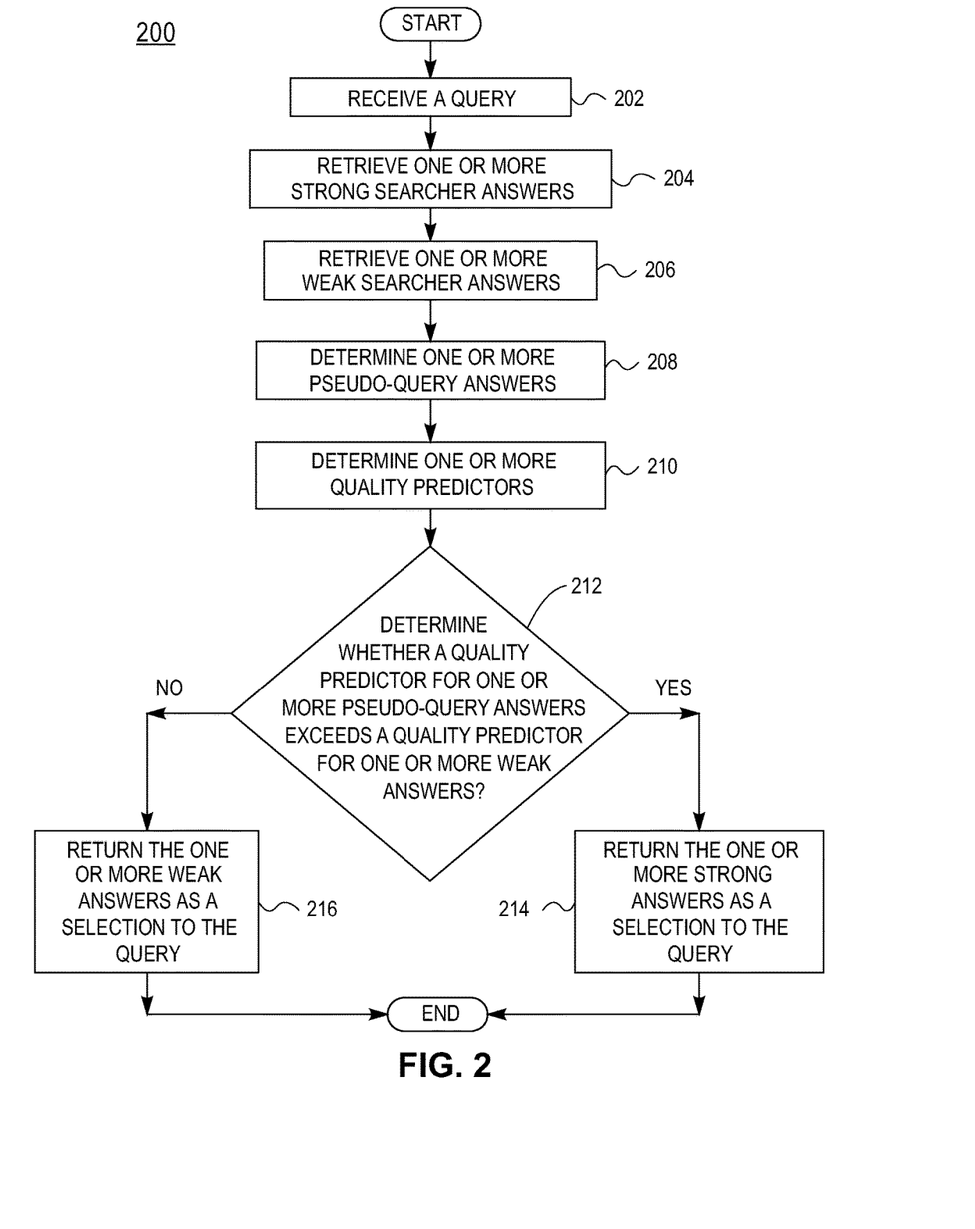
FIG. 2 is a flowchart depicting operational steps of a query answering program (such as the query answering program of FIG. 1), in accordance with an embodiment of the present invention.

FIG. 2 is a flowchart illustrating operational steps of query answering program 110, generally designated 200, in accordance with an embodiment of the present invention. In some embodiments discussed herein, devices, such as client device 106 and computing device 108, can initiate query answering program 110 by connecting to server 104 via network 102.

Query answering program 110 receives a query (202). In an embodiment, query answering program 110 receives a query from a user. In another embodiment, query answering program 110 receives a query in which the query is predetermined. In an embodiment, a query can be a question type, such as a question type about facts, items, definitions, hypotheticals, language translation, or other questions that may be analyzed by a weak searcher or strong searcher. For example, query answering program 110 receives a query (e.g. Computer chip type) from a user.

Query answering program 110 retrieves one or more strong searcher answers (step 204). In an embodiment, query answering program 110 retrieves one or more strong searcher answers, in which a strong searcher answer is the single answer provided by a strong searcher. In an embodiment, query answering program 110 retrieves a strong searcher answer from each of the one or more strong searchers. In an embodiment, query answering program 110 stores the one or more strong searcher answers in a data storage repository. In another embodiment, query answering program 110 stores the one or more strong searcher answers locally on a device, such as client device 106 or computing device 108. In an example, query answering program 110 may retrieve a first strong searcher answer (e.g. "central processing unit (CPU) chip") from a first strong searcher, a second strong searcher answer (e.g. "personal computer")

from a second strong searcher, and a third strong searcher answer (e.g. "read only memory (ROM) chip") from a third strong searcher.

Query answering program 110 retrieves one or more weak searcher answers (step 206). In an embodiment, query answering program 110 retrieves one or more weak searcher answers from a weak searcher. In an embodiment, query answering program 110 stores the one or more weak searcher answers in a data storage repository. In another embodiment, query answering program 110 stores the one or more weak searcher answers locally on a device, such as client device 106 or computing device 108. Query answering program 110 may retrieve the weak searcher answers (e.g. "graphical processor unit (GPU) chip" and "random access memory (RAM) chip") from a first weak searcher. In one embodiment, query answering program 110 determines a top weak searcher answer by determining which of the one or more weak searcher answers from the weak searcher is most relevant to a question type submitted for query, where relevancy of the top weak searcher answer to the question type may be based, at least in part, on one or more shared keywords, topics, values, etc. In an alternative embodiment, the top weak searcher answer from the weak searcher may be user defined, such as where a user believes at least one of the one or more weak searcher answers more accurately addresses a question type submitted as a query to the weak searcher. In one embodiment, the top weak searcher answer may be flagged and stored locally on a device, such as client device 106 or computing device 108, for future retrieval.

In an embodiment, where query answering program 110 determines a strong searcher answer and the top weak searcher answer are the same answer, query answering program 110 returns the same answer as the selection to the query and ends. Query answering program 110 may display the returned same answer on a user interface. For example, query answering program 110 may retrieve a strong searcher answer (e.g. "read only memory (ROM) chip") from a third strong searcher, and query answering program 110 may retrieve a top weak searcher answer (e.g. "ROM chip") from a second weak searcher. Query answering program 110 determines the strong searcher answer and top weak searcher answer are the same answer (e.g. ROM chip). Query answering program 110 returns "ROM chip" as the selection to the query and ends.

In one embodiment, responsive to determining the one or more strong searcher answers and the top weak searcher answer are not the same answer, query answering program 110 determines one or more pseudo-query answers (step 208). In an embodiment, query answering program 110 determines one or more pseudo-query answers by retrieving one or more pseudo-queries from the weak searcher. In an embodiment, a pseudo-query is a retrieved strong searcher answer (e.g. "CPU chip" and "Personal Computer"). In one embodiment, a strong search answer may be used as a query to the one or more weak searchers. In another embodiment, pseudo-relevance feedback may be used to induce a list of query related terms which will serve as a pseudo-query, where the pseudo-query is generated using the pseudo-relevance feedback (i.e., the strong searcher answer is submitted as a query to the weak searcher, and a set of query relevant terms are determined from the top k retrieved documents, where the set of query relevant terms may be determined based, at least in part, on one or more shared keywords, topics, values, etc., with a question type submitted as a query, and where the number of such terms in the set of query relevant terms used to determine the pseudo query is referred to as "clipping"). In an alternative embodiment, the set of query relevant terms may be user defined, such as where a user selects the number of terms in the set of query relevant terms used to determine the pseudo query, where the selected number of terms are determined to accurately addresses a question type submitted as a query. In one embodiment, query answering program 110 may submit the one or more pseudo-queries to the weak searcher. In one embodiment, query answering program 110 retrieves the one or more pseudo-query answers from the weak searcher. In an embodiment, the number of terms to be clipped may be a user-defined number of terms, a default number of terms, or a pre-defined number of terms. For example, where query answering program 110 submits a first strong searcher answer (e.g. "CPU chip") as a first pseudo-query to the weak searcher, query answering program 110 may retrieve two pseudo-query answers (e.g. "Microprocessor Chip" and "Multi-core Processor"). Where query answering program 110 submits a second strong searcher answer (e.g. "personal computer") as a second pseudo-query to the weak searcher, query answering program 110 may retrieve two pseudo-query answers (e.g. "Laptop Computer" and "Desktop Computer"). In an embodiment, query answering program 110 stores the one or more pseudo-query answers in a data storage repository. In another embodiment, query answering program 110 stores the one or more pseudo-query answers locally on a device, such as client device 106 or computing device 108.

Query answering program 110 determines one or more quality predictors (step 210). In an embodiment, query answering program 110 determines one or more quality predictors for the one or more pseudo-query answers and for the one or more weak searcher answers.

In an embodiment, a quality predictor may be based, at least in part, on a quality feature value of the one or more answers. In an embodiment, query answering program 110 determines a quality feature value for one or more pseudo-query answers and for one or more weak searcher answers. Query answering program 110 may determine quality feature values using a conventional query performance predictor known in the art. The quality feature value may be a numerical value on a weighted scale, for example 1-10, where 1 indicates a low quality feature value and 10 indicates a high quality feature value. In an embodiment, query answering program 110 determines a ratio of the quality feature values for the one or more pseudo-query answers and for one or more weak searcher answers. For example, query answering program 110 may take the ratio of the pseudo-query answers with the highest of low quality feature values. Query answering program 110 determines the ratio to be the quality predictor for the one or more pseudo-query answers. The ratio may be a real number. In another embodiment, query answering program 110 submits the ratio into a Sigmoid function to determine an absolute value (i.e., an absolute zero) of the ratio in a probabilistic range. In an embodiment, query answering program 110 stores the quality feature value of one or more answers in a data storage repository or locally on a device, such as client device 106 or computing device 108.

In another embodiment, a quality predictor may be based, at least in part, on a query drift value of the one or more answers. In an embodiment, query answering program 110 determines the query drift value between the received query and the one or more pseudo-queries. Query answering program 110 determines the query drift value between the received query and the one or more weak searcher answers. In an embodiment, the query drift value can be a numerical value, for example 1-10, where 1 indicates a small degree of drift from the received query and 10 indicates a high degree of drift from the received query. In an embodiment, the query drift value can be a categorical value, for example, least drift to most drift from the received query. In an embodiment, query answering program 110 determines the query drift value utilizing a conventional language model known in the art (e.g., measuring divergence between an original query language model (LM) and the pseudo-query LM). In another embodiment, query answering program 110 stores the query drift value of one or more answers in a data storage repository or locally on a device, such as client device 106 or computing device 108.

In yet another embodiment, a quality predictor may be based, at least in part, on the quality feature value and the query drift of the answer.

Responsive to determining one or more quality predictors, query answering program 110 determines whether a quality predictor for one or more pseudo-query answers exceeds a quality predictor for one or more weak answers (decision block 212).

Where query answering program 110 determines the quality predictor for one or more pseudo-query answers does exceed a quality predictor for one or more weak answers (decision block 212, "YES" branch), query answering program 110 returns the one or more strong searcher answers as a selection to the query (step 214) and ends.

Where query answering program 110 determines the quality predictor for one or more pseudo-query answers does not exceed a quality predictor for one or more weak answers (decision block 212, "NO" branch), query answering program 110 returns the one or more weak searcher answers as a selection to the query (step 216) and ends.

Figure 3:
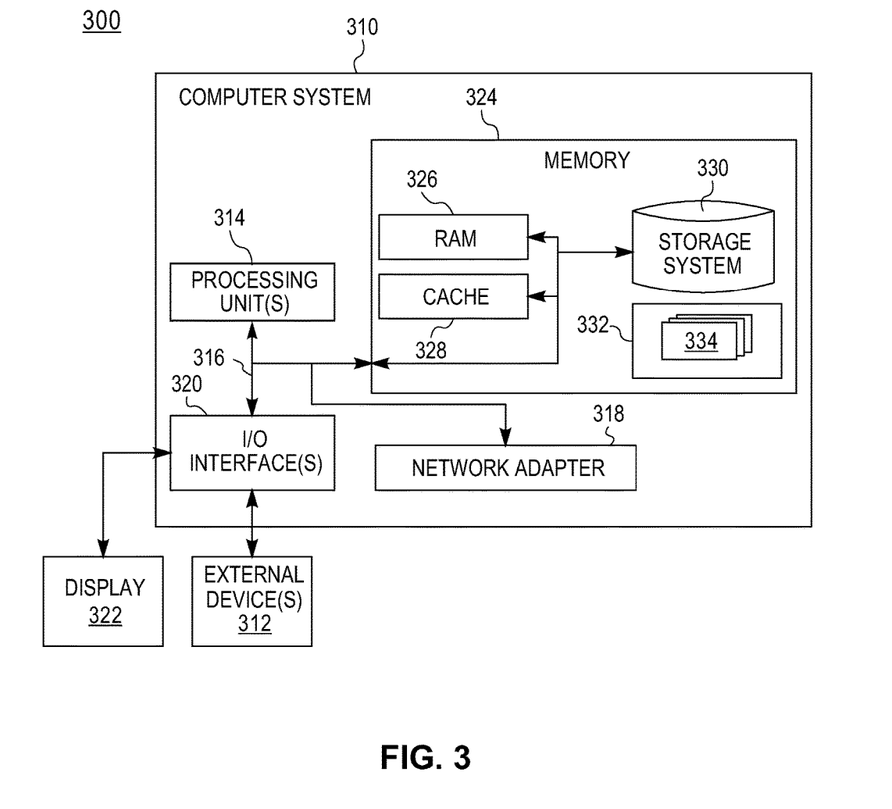
FIG. 3 is a block diagram depicting components of a data processing system (such as the server of FIG. 1), in accordance with an embodiment of the present invention.

FIG. 3 is a block diagram depicting components of a data processing system, such as server 104 of data processing environment 100, generally designated 300, in accordance with an embodiment of the present invention. FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for determining a query answer selection, the method comprising:
   receiving, by one or more computer processors, one or more queries, wherein the one or more queries include one or more question types;
   retrieving, by one or more computer processors, one or more strong searcher answers and one or more weak searcher answers, wherein the one or more strong searcher answers are provided by one or more strong searcher engines and the one or more weak searcher answers are provided by one or more weak searcher engines;

determining, by one or more computer processors, one or more pseudo-query answers, wherein determining the one or more pseudo-query answers includes utilizing the one or more strong searcher answers as a query to the one or more weak searcher engines, wherein determining includes generating a pseudo query using pseudo-relevance feedback, wherein pseudo-relevance feedback includes one or more query relevant terms determined from one or more retrieved documents, and wherein the one or more query relevant terms are clipped to a pre-defined number of terms;

determining, by one or more computer processors, one or more quality predictors for the one or more pseudo-query answers and the one or more weak searcher answers; and responsive to determining the one or more quality predictors, determining, by one or more computer processors, whether at least one of the one or more quality predictors for the one or more pseudo-query answers exceeds at least one of the one or more quality predictors for the one or more weak searcher answers.

2. The method of claim 1, wherein the one or more question types includes one or more of:
a fact question type;
an item question type;
a definition question type;
a hypothetical question type; and
a language translation question type.

3. The method of claim 1 further comprises:
determining, by one or more computer processors, whether at least one of the one or more strong searcher answers and a top weak searcher answer from the one or more weak searcher answers are the same answer; and
responsive to determining that at least one of the one or more strong searcher answers and a top weak searcher answer from the one or more weak searcher answers are the same answer, returning, by one or more computer processors, the top weak searcher answer as a selection to the query.

4. The method of claim 1, wherein determining one or more quality predictors for the one or more pseudo-query answers and the one or more weak searcher answers further comprises:
determining, by one or more computer processors, a quality feature value for the one or more pseudo-query answers and the one or more weak searcher answers, wherein the quality feature value is a numerical value on a weighted scale;
determining, by one or more computer processors, a ratio of the quality feature value of the one or more pseudo-query answers relative to the quality feature value of the one or more weak searcher answers; and
determining, by one or more computer processors, an absolute zero of the ratio in a probabilistic range by submitting the ratio into a sigmoid function.

5. The method of claim 1, wherein determining one or more quality predictors for the one or more pseudo-query answers and the one or more weak searcher answers further comprises:
determining, by one or more computer processors, a query drift value between the one or more pseudo-query answers and the one or more weak searcher answers, wherein the query drift value is a numerical value measuring the divergence between an original query language model and a pseudo-query language model.

6. The method of claim 1, further comprises:
responsive to a determination that at least one of the one or more quality predictors for the one or more pseudo-query answers exceeds at least one of the one or more quality predictors for the one or more weak searcher answers, returning, by one or more computer processors, the one or more strong searcher answers as the query answer selection to the query; and
responsive to a determination that the one or more quality predictors for the one or more pseudo-query answers do not exceed at least one of the one or more quality predictors for the one or more weak searcher answers, returning, by one or more computer processors, the one or more weak searcher answers as the query answer selection to the query.

7. A computer program product for determining a query answer selection, the computer program product comprising:
one or more computer readable storage media and program instructions stored on the one or more computer readable storage media, the program instructions comprising:
program instructions to receive one or more queries, wherein the one or more queries include one or more question types;
program instructions to retrieve one or more strong searcher answers and one or more weak searcher answers, wherein the one or more strong searcher answers are provided by one or more strong searcher engines and the one or more weak searcher answers are provided by one or more weak searcher engines;
program instructions to determine one or more pseudo-query answers, wherein determining the one or more pseudo-query answers includes utilizing the one or more strong searcher answers as a query to the one or more weak searcher engines, wherein determining includes generating a pseudo query using pseudo-relevance feedback, wherein pseudo-relevance feedback includes one or more query relevant terms determined from one or more retrieved documents, and wherein the one or more query relevant terms are clipped to a pre-defined number of terms;
program instructions to determine one or more quality predictors for the one or more pseudo-query answers and the one or more weak searcher answers; and
responsive to determining the one or more quality predictors, program instructions to determine whether at least one of the one or more quality predictors for the one or more pseudo-query answers exceeds at least one of the one or more quality predictors for the one or more weak searcher answers.

8. The computer program product of claim 7, wherein the one or more question types includes one or more of:
a fact question type;
an item question type;
a definition question type;
a hypothetical question type; and
a language translation question type.

9. The computer program product of claim 7 further comprises:
program instructions to determine whether at least one of the one or more strong searcher answers and a top weak searcher answer from the one or more weak searcher answers are the same answer; and responsive to determining that at least one of the one or more strong searcher answers and a top weak searcher answer from the one or more weak searcher answers are the same answer, program instructions to return the top weak searcher answer as a selection to the query.

10. The computer program product of claim 7, wherein program instructions to determine one or more quality predictors for the one or more pseudo-query answers and the one or more weak searcher answers further comprises:

program instructions to determine a quality feature value for the one or more pseudo-query answers and the one or more weak searcher answers, wherein the quality feature value is a numerical value on a weighted scale;

program instructions to determine a ratio of the quality feature value of the one or more pseudo-query answers relative to the quality feature value of the one or more weak searcher answers; and program instructions to determine an absolute zero of the ratio in a probabilistic range by submitting the ratio into a sigmoid function.

11. The computer program product of claim 7, wherein program instructions to determine one or more quality predictors for the one or more pseudo-query answers and the one or more weak searcher answers further comprises:

program instructions to determine a query drift value between the one or more pseudo-query answers and the one or more weak searcher answers, wherein the query drift value is a numerical value measuring the divergence between an original query language model and a pseudo-query language model.

12. The computer program product of claim 7, further comprises:

responsive to a determination that at least one of the one or more quality predictors for the one or more pseudo-query answers exceeds at least one of the one or more quality predictors for the one or more weak searcher answers, program instructions to return the one or more strong searcher answers as the query answer selection to the query; and responsive to a determination that the one or more quality predictors for the one or more pseudo-query answers do not exceed at least one of the one or more quality predictors for the one or more weak searcher answers, program instructions to return the one or more weak searcher answers as the query answer selection to the query.

13. A computer system for determining a query answer selection, the computer system comprising:

one or more computer readable storage media; and
program instructions stored on at least one of the one or more computer readable storage media for execution by at least one of the one or more computer processors, the program instructions comprising:

program instructions to receive one or more queries, wherein the one or more queries include one or more question types;

program instructions to retrieve one or more strong searcher answers and one or more weak searcher answers, wherein the one or more strong searcher answers are provided by one or more strong searcher engines and the one or more weak searcher answers are provided by one or more weak searcher engines;

program instructions to determine one or more pseudo-query answers, wherein determining the one or more pseudo-query answers includes utilizing the one or more strong searcher answers as a query to the one or more weak searcher engines, wherein determining includes generating a pseudo query using pseudo-relevance feedback, wherein pseudo-relevance feedback includes one or more query relevant terms determined from one or more retrieved documents, and wherein the one or more query relevant terms are clipped to a pre-defined number of terms;

program instructions to determine one or more quality predictors for the one or more pseudo-query answers and the one or more weak searcher answers; and responsive to determining the one or more quality predictors, program instructions to determine whether at least one of the one or more quality predictors for the one or more pseudo-query answers exceeds at least one of the one or more quality predictors for the one or more weak searcher answers.

14. The computer system of claim 13, wherein the one or more question types includes one or more of:
a fact question type;
an item question type;
a definition question type;
a hypothetical question type; and
a language translation question type.

15. The computer system of claim 13, further comprises:
program instructions to determine whether at least one of the one or more strong searcher answers and a top weak searcher answer from the one or more weak searcher answers are the same answer; and responsive to determining that at least one of the one or more strong searcher answers and a top weak searcher answer from the one or more weak searcher answers are the same answer, program instructions to return the top weak searcher answer as a selection to the query.

16. The computer system of claim 13, wherein program instructions to determine one or more quality predictors for the one or more pseudo-query answers and the one or more weak searcher answers further comprises:

program instructions to determine a quality feature value for the one or more pseudo-query answers and the one or more weak searcher answers, wherein the quality feature value is a numerical value on a weighted scale;

program instructions to determine a ratio of the quality feature value of the one or more pseudo-query answers relative to the quality feature value of the one or more weak searcher answers; and program instructions to determine an absolute zero of the ratio in a probabilistic range by submitting the ratio into a sigmoid function.

17. The computer system of claim 13, further comprises:
responsive to a determination that at least one of the one or more quality predictors for the one or more pseudo-query answers exceeds at least one of the one or more quality predictors for the one or more weak searcher answers, program instructions to return the one or more strong searcher answers as the query answer selection to the query; and responsive to a determination that the one or more quality predictors for the one or more pseudo-query answers do not exceed at least one of the one or more quality predictors for the one or more weak searcher answers, program instructions to return the one or more weak searcher answers as the query answer selection to the query.

* * * * *